(12) United States Patent
Nakashita

(10) Patent No.: US 7,380,965 B2
(45) Date of Patent: Jun. 3, 2008

(54) LIGHT SOURCE APPARATUS, OPTICAL APPARATUS, AND IMAGE PROJECTION APPARATUS

(75) Inventor: Daisuke Nakashita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 11/229,108

(22) Filed: Sep. 16, 2005

(65) Prior Publication Data

US 2006/0062001 A1    Mar. 23, 2006

(30) Foreign Application Priority Data

Sep. 17, 2004  (JP)  .............................. 2004-271055
Sep. 17, 2004  (JP)  .............................. 2004-272532

(51) Int. Cl.
*F21V 29/02* (2006.01)

(52) U.S. Cl. ......................... 362/373; 353/61; 362/394

(58) Field of Classification Search ................ 362/373, 362/294; 353/61, 57
See application file for complete search history.

(56) References Cited

U.S. PATENT DOCUMENTS

| | | | |
|---|---|---|---|
| 6,402,346 B1 * | 6/2002 | Liao et al. | 362/294 |
| 6,481,854 B1 | 11/2002 | Sugawara et al. | |
| 6,846,096 B2 * | 1/2005 | Hsu et al. | 362/294 |
| 7,014,322 B2 * | 3/2006 | Okoshi | 353/61 |
| 7,147,349 B2 * | 12/2006 | Kato et al. | 362/294 |
| 2001/0021006 A1 | 9/2001 | Shimizu | |
| 2001/0031599 A1 | 10/2001 | Teichgraeber et al. | |
| 2004/0085768 A1 | 5/2004 | Kai et al. | |

FOREIGN PATENT DOCUMENTS

| | | |
|---|---|---|
| EP | 0 526 653 A1 | 2/1993 |
| EP | 0866359 A1 | 9/1998 |

(Continued)

OTHER PUBLICATIONS

Communication issued by European Patent Office dated Oct. 6, 2006 and Extended Search Report completed Sep. 29, 2006 for European patent application No. 05020233.2.

(Continued)

*Primary Examiner*—Anabel M Ton
(74) *Attorney, Agent, or Firm*—Morgan & Finnegan, LLP

(57) ABSTRACT

A light source apparatus is disclosed which allows effective cooling of an arc tube even with a small amount of wind. The light source apparatus has a light emitter and a reflector which reflects light from the light emitter and causes the reflected light to emerge. The light source apparatus also has a wind-guiding member which has a flow inlet and a flow outlet of cooling wind and has a wall portion at a position opposite to the flow inlet, the wall portion guiding the cooling wind toward the light emitter in the reflector. The light source apparatus which has a reflector to which an arc tube is fixed via a connecting member, and has a first flow path on which cooling wind from a fan flows to cool an area of the arc tube closer to the connecting member, and a second flow path on which cooling wind from the fan flows to cool an area of the arc tube closer to a light emitting portion. The second flow path is formed separately from the first flow path.

10 Claims, 13 Drawing Sheets

FOREIGN PATENT DOCUMENTS

| | | |
|---|---|---|
| EP | 0 985 875 A2 | 3/2000 |
| JP | 8-314011 | 11/1996 |
| JP | 10-186517 | 7/1998 |
| JP | 11-039934 | 2/1999 |
| JP | 2000-021230 | 1/2000 |
| JP | 2000-036215 | 2/2000 |
| JP | 2000-057825 | 2/2000 |
| JP | 2000-082322 | 3/2000 |
| JP | 2002-245842 | 8/2002 |
| JP | 2003-346547 | 12/2003 |
| JP | 2004-014204 | 1/2004 |

OTHER PUBLICATIONS

Official Communication from EP Patent Office, dated Mar. 24, 2006 and Partial European Search Report dated Mar. 10, 2006.

\* cited by examiner

PRIOR ART

LIGHT SOURCE APPARATUS, OPTICAL APPARATUS, AND IMAGE PROJECTION APPARATUS

BACKGROUND OF THE INVENTION

The present invention relates to a light source apparatus for use in an optical apparatus such as an image projection apparatus, an exposure apparatus, and a copier, and more particularly, to a cooling structure in a light source apparatus.

An arc tube as in an ultrahigh pressure mercury lamp is used in a light source for use in an optical apparatus as described above. When such an arc tube is used, a cover member (an explosion-proof member) made of a light-transmissive material such as glass is disposed in front thereof in order to prevent any breakage of the arc tube from scattering its fragments or mercury outside. Thus, the inner side of a reflector for reflecting light from a light emitter in a predetermined direction to collect the reflected light is an almost sealed structure such that the heat of the arc tube serving as a heat source is not exhausted easily.

On the other hand, to increase the operating pressure of the arc tube to allow the arc tube to offer desired light emitting performance, the temperature of the arc tube needs to be increased. However, too high a temperature of the arc tube cannot guarantee operation thereof over a long time. In other words, unless the temperature of the arc tube is maintained in an appropriate range, a devitrification phenomenon of the arc tube occurs such as blackening and whitening or the operation is destabilized. It is thus necessary to perform proper cooling for the arc tube (see Japanese Patent Laid-Open No. 8(1996)-314011 and Japanese Patent Laid-Open No 2002-245842).

In a cooling structure disclosed in Japanese Patent Laid-Open No. 8(1996)-314011, an exhaust fan is provided at the back of a lamp unit, and air is introduced from an upper front portion of the lamp unit and exhausted outside a housing from a lower portion of the lamp unit through an exhaust port provided for the housing.

In a cooling structure disclosed in Japanese Patent Laid-Open No 2002-245842, air in a lamp container is exhausted by a blower provided at the back of the lamp to flow air for cooling in the lamp container. Part of the air for cooling in the lamp container flows into a reflector of the lamp unit from an air inlet formed in the front of the lamp body, passes through the reflector, and is exhausted from an air outlet formed in a neck portion of the reflector.

In the cooling structure proposed in Japanese Patent Laid-Open No. 8(1996)-314011, however, cooling wind smoothly flows near an opening of the reflector, but does not easily reach an arc tube provided near a neck portion of the reflector. This causes the problem of poor efficiency in cooling the arc tube.

In the cooling structure disclosed in Japanese Patent Laid-Open No. 2002-245842, the exhaust hole provided between the neck portion of the reflector and the arc tube is close to the portion where the arc tube is attached to the reflector, so that it is not possible to form a sufficient opening for the exhaust hole which is provided for exhausting high-temperature air stored within the reflector. Thus, the structure has the problem of poor efficiency in cooling the arc tube.

While the cooling efficiency can be improved by increasing the revolutions of the exhaust fan or the size of the exhaust fan, noise or the size of the entire apparatus may be increased in such a case.

The ultrahigh pressure mercury lamp is formed of an arc tube which has a cathode and a anode disposed opposite to each other in a glass tube which is filled with gas and mercury, a reflector having a reflecting mirror for changing light from the arc tube into collimated light, and an attaching member for attaching the arc tube to the reflector.

As shown in FIG. 16, a generally cylindrical arc tube 901 is typically fixed to a reflector 902 via an attaching member 903. Specifically, the arc tube 901 is placed at the center of the reflector 902 and fixed to the attaching member 903 such that the focal point of the surface forming the reflecting mirror within the reflector 902 matches a light-emitting portion of the arc tube 901. This can provide collimated light with high efficiency in collecting light.

The arc tube 901 has a spherical portion (the light-emitting portion) 901a, a cathode seal portion 901b, an anode seal portion 901c, and a brace welding portion 901d. Cooling conditions (recommended temperature ranges) are set for the respective portions such as a temperature range from 900 to 1000° C. above the spherical portion 901a, a range of 900±20° C. below the spherical portion 901a, and a range of 420° C. or lower in the cathode and anode seal portions 901b and 901c, by way of example.

For this reason, a conventionally disclosed structure is formed to supply wind near the opening of the reflector to cool the arc tube as in Japanese Patent Laid-Open No. 2000-82322. Specifically, as shown in FIG. 16, wind is supplied from an intake port 904 near the opening of the reflector and flowed along the reflecting surface of the reflector 902, and the air which cooled the spherical portion 901a is exhausted from an exhaust port 905 closer to the attaching member 903.

Japanese Patent Laid-Open No 2000-21230 has disclosed a structure in which air is supplied from a portion closer to an attaching member 903 at the back of a reflector 902 to cool an arc tube 901 as shown in FIG. 17.

To use a discharge lamp for a long time and provide stable emission of light, it is essential not only to realize a cooling structure which cools the high pressure mercury discharge lamp such that each portion of the high pressure mercury discharge lamp is operated in the recommended temperature range but also to ensure that mercury is adhered to a cathode when the lamp is lit.

In view of those points, while the structure disclosed in Japanese Patent Laid-Open No 2000-82322 sufficiently cools the anode seal portion 901c closer to the leading end of the arc tube 901, the spherical portion 901a is at the highest temperature in the arc tube 901 and the wind after it cools the spherical portion 901a is at high temperature with reduced cooling ability. It is difficult for such wind to sufficiently cool the cathode seal portion 901b closer to the attaching member. For example, when the cathode is disposed closer to the attaching member, the cathode seal portion 901b may be at high temperature to melt and break the metal portion.

In addition, since a reduction in temperature in the cathode seal portion is slower than that in the anode seal portion and the spherical portion, liquid mercury changed from the solid state does not adhere to the cathode but adheres to the anode or a glass wall surface of the spherical portion, the temperature of which is reduced below the boiling point.

Consequently, the cathode is exposed when the lamp is lit next, and the abovementioned phenomenon is repeated to sputter the cathode, which easily causes the phenomenon of blacking. In other words, the life of the lamp is reduced.

In the structure disclosed in Japanese Paten Laid-Open No. 2000-21230, when the anode is disposed at the back of the reflector, it is difficult to cool the cathode since it is downwind of the cooling wind. Mercury is unlikely to adhere to the cathode in cooldown after the lamp is turned off, resulting in the blacking phenomenon. In contrast, when the cathode is disposed at the back of the reflector, the temperature of the cathode is first reduced after the lamp is turned off since it is upwind. The condensed mercury can adhere to the cathode to achieve an ideal state.

In the structure, however, the air is supplied from the back of the reflector with a narrow opening, so that a significant amount of pressure is lost when the air passes through an intake port 905. This leads to the problem of failing to supply cooling wind enough to cool the spherical portion 901*a* of the arc tube 901 if a high-power lamp is used.

BRIEF SUMMARY OF THE INVENTION

It is an object of the present invention to provide a light source apparatus which allows effective cooling of an arc tube even with a small amount of wind, an optical apparatus, and an image projection apparatus which employ the light source apparatus.

It is another object of the present invention to provide a light source apparatus which has a cooling structure allowing driving of a lamp in a recommended temperature range while the lamp is lit and taking account of a change in temperature after the lamp is turned off, and an optical apparatus, and an image projection apparatus which employ the light source apparatus.

According to an aspect, the present invention provides a light source apparatus which has a light emitter and a reflector which reflects light from the light emitter and causes the reflected light to emerge. The light source apparatus also has a wind-guiding member which has a flow inlet and a flow outlet of cooling wind and has a wall portion at a position opposite to the flow inlet, the wall portion guiding the cooling wind toward the light emitter in the reflector.

According to another aspect, the present invention provides a light source apparatus which has a fan, an arc tube which has a light emitting portion between a cathode and an anode disposed opposite to each other, a reflector to which the arc tube is fixed via a connecting member, a first flow path on which cooling wind from the fan flows to cool an area of the arc tube closer to the connecting member, and a second flow path on which cooling wind from the fan flows to cool an area of the arc tube closer to the light emitting portion. The second flow path is formed separately from the first flow path.

Further object and features of the present invention will become apparent from the following detailed description of preferred embodiments with reference to the attached drawings.

DETAILED DESCRIPTION OF THE PREFERRED EMBODIMENTS

Preferred embodiments of the present invention will hereinafter be described with reference to the drawings.

General Structure

Figure 1:
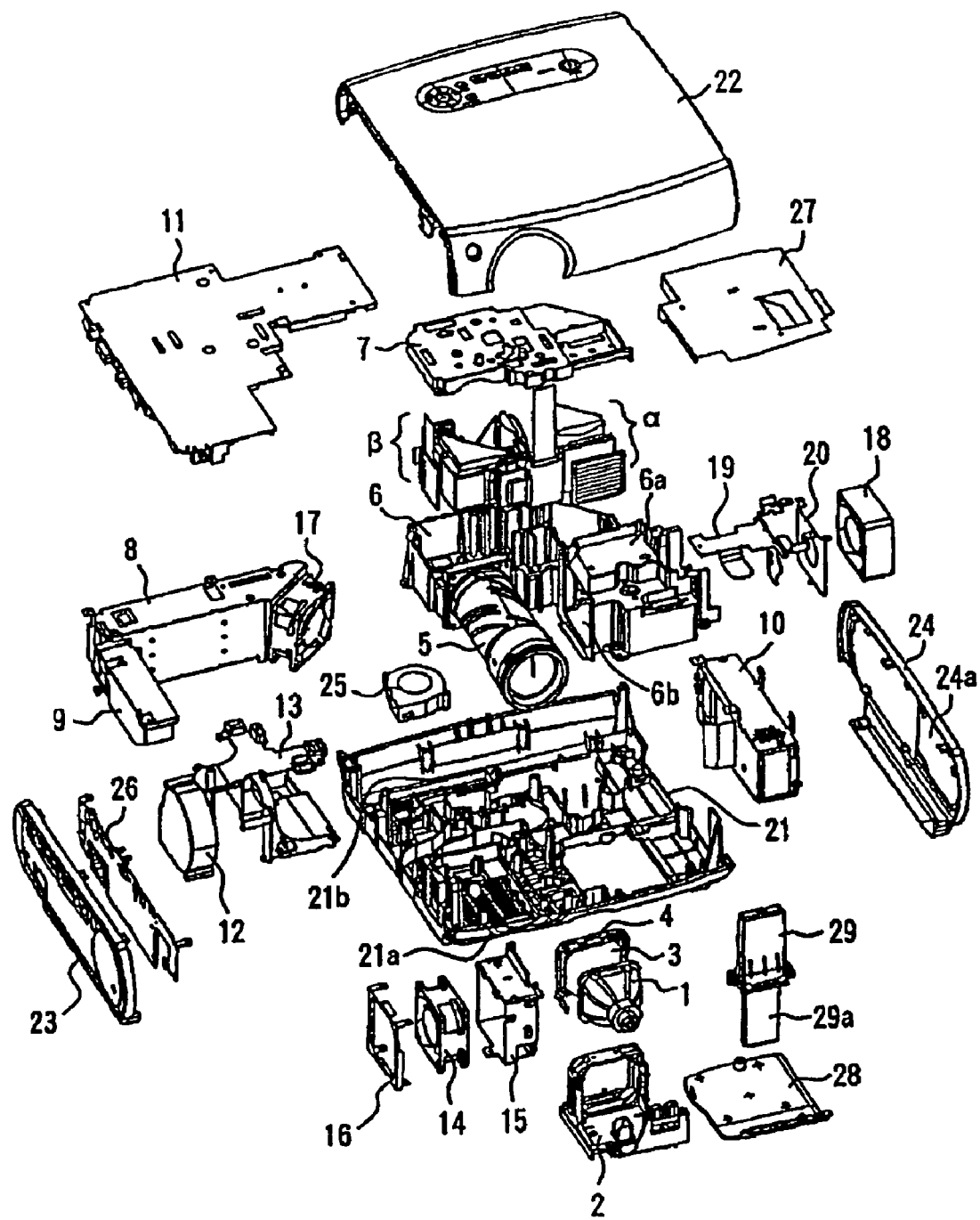
FIG. 1 is an exploded perspective view showing an image projection apparatus which has a light source apparatus which is Embodiment 1 of the present invention.

FIG. 1 shows the structure of an image projection apparatus (projector) which is an exemplary optical apparatus and has a light source apparatus serving as Embodiment 1 of the present invention. In FIG. 1, reference numeral 1 shows a lamp unit, 2 a lamp holder which holds the lamp unit 1, 3 an explosion-proof glass, and 4 a glass holder.

Reference character α shows an illumination optical system which receives light from the lamp unit 1, and β a color separation/combination optical system which separates light emerging from the illumination optical system a for colors and directs the light toward a liquid crystal panel (an image forming device) for each of three colors of R, G, and B.

Reference numeral 5 shows a projection lens barrel which projects light emerging from the color separation/combination optical system β to a screen (a projected screen), not shown. A projection lens optical system, later described, is housed in the projection lens barrel 5.

Reference numeral 6 shows an optical box which contains the lamp unit 1, the illumination optical system α, and the color separation/combination optical system β and to which the projection lens barrel 5 is fixed. The optical box 6 has a lamp case portion 6*a* formed thereon for surrounding the lamp unit 1.

Reference numeral 7 shows an optical box lid which closes the optical box 6 with the illumination optical system α and the color separation/combination optical system β housed therein. Reference numeral 8 shows a power source, 9 a power source filter, 10 a ballast power source which lights the lamp unit 1, and 11 a circuit board which controls the driving of the liquid crystal panel and the lighting of the lamp unit 1 with power from the power source 8.

Reference numeral 12 shows an optical system cooling fan which takes air in from an intake port 21*a* of an external cabinet 21, later described, to cool an optical device such as the liquid crystal panel within the color separation/combination optical system β, and 13 a fan duct which directs cooling wind produced by the optical system cooling fan 12 to the optical device such as the liquid crystal panel within the color separation/combination optical system β.

Reference numeral 14 shows a lamp cooling fan which blows cooling wind to the lamp unit 1 to cool the lamp unit 1 and is disposed between the lamp unit 1 and the projection lens barrel 5.

Reference numeral 15 shows a fan holding member which holds the lamp cooling fan 14. Reference numeral 16 shows a fan holding plate, and 17 a power source cooling fan which takes air in from an intake port 21b provided for the external cabinet 21, later described, to circulate cooling wind within the power source 8, and circulates wind in the ballast power source 10, thereby simultaneously cooling the power source 8 and the ballast power source 10.

Reference numeral 18 shows an exhaust fan. The exhaust fan 18 discharges hot wind after it is blown from the lamp cooling fan 14 and passes the lamp unit 1 and hot wind after it cools the ballast power source 10 outside the image projection apparatus from an exhaust port 24a formed in an external side plate 24, later described.

Reference numeral 19 shows a lamp radiation plate. Reference numeral 20 shows a lamp exhaust/light-shielding mask which has the function of radiating heat in the lamp unit 1 and the function as an air duct for transmitting hot wind after it cooled the lamp 1 as well as the function of shielding light such that light from the lamp unit 1 is not leaked outside the apparatus.

Reference numeral 21 shows the external cabinet (an external lower case) which contains the optical box 6 and the like and has the abovementioned intake ports 21a and 21b formed therein. Reference numeral 22 shows an external cabinet lid (an external upper case) for closing the external cabinet 21 with the optical box 6 and the like housed therein. Reference numeral 23 shows an external side plate disposed on the left when viewed from the front of the projection lens barrel 5, and 24 the external side plate disposed on the right. The external side plate 24 has the abovementioned exhaust port 24a formed therein.

Reference numeral 25 shows a device cooling fan for cooling optical devices such as a polarization device which constitute the color separation/combination optical system β. The device cooling fan 25 blows air from an intake port, not shown, of the external cabinet 21 to the abovementioned optical device through a duct portion, not shown, formed in the external cabinet 21.

Reference numeral 26 shows an interface reinforcing plate which is attached inside the external side plate 23. Reference numeral 27 shows an external radiation plate which is attached to the lamp case 6a to radiate heat from the lamp unit 1.

Reference numeral 28 shows a lamp lid. The lamp lid 28 is provided removably on the bottom surface of the external cabinet 21 and fixed thereto with springs, not shown. Reference numeral 29 shows a set adjusting leg which is fixed to the external cabinet 21 and is formed such that the level of a leg portion 29a is adjustable. The level adjustment of the leg portion 29a allows adjustment of an inclination angle of the image projection apparatus.

Optical Structure

Next, description will be made of the structure of an image display optical system formed of the abovementioned lamp unit 1, the illumination optical system α, the color separation/combination optical system β, the reflecting type liquid crystal display devices (liquid crystal panels), and a projection lens optical system 70 in the projection lens barrel 5 with reference to FIG. 2.

Figure 2:
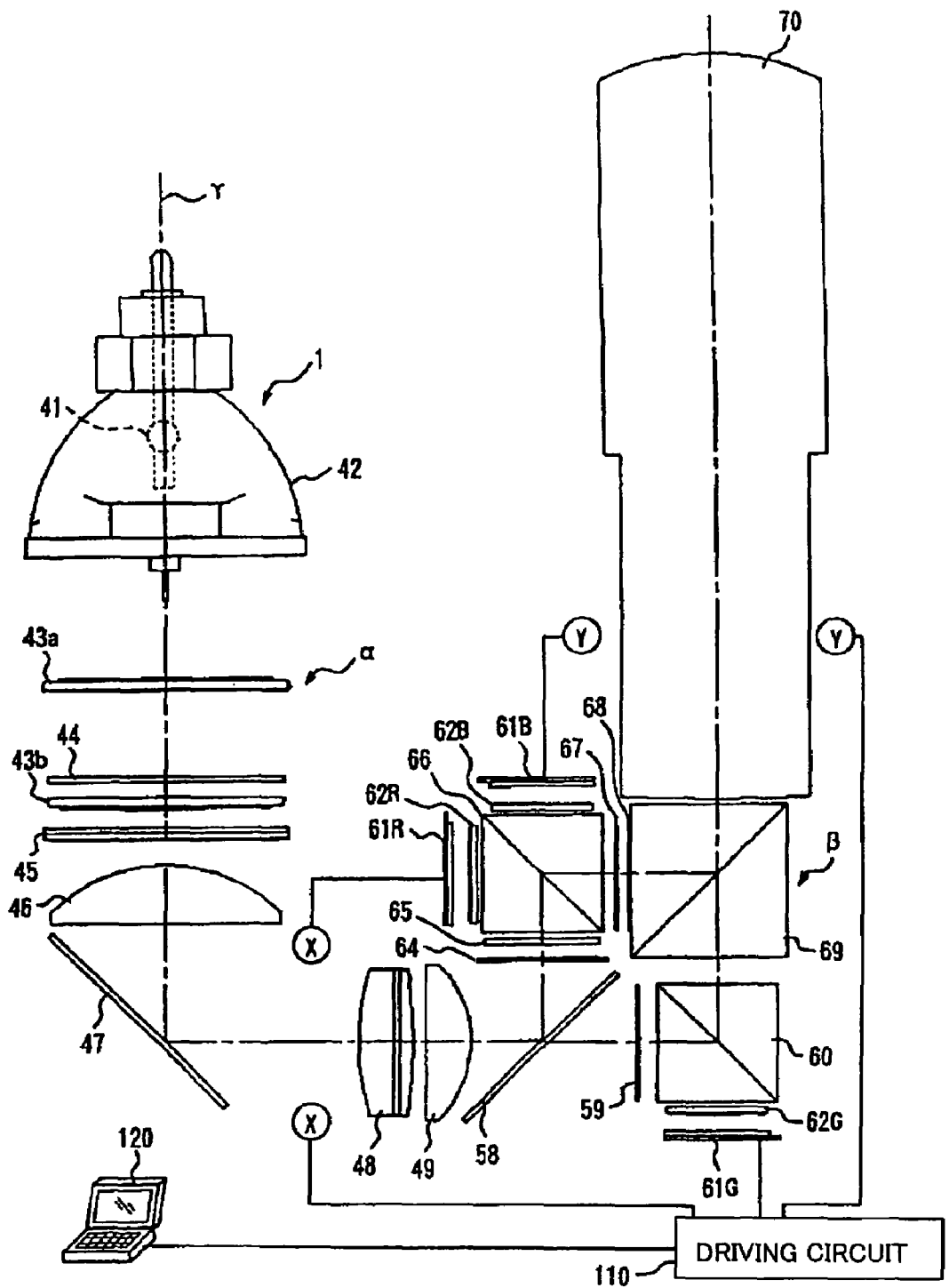
FIG. 2 shows the optical structure of the image projection apparatus in Embodiment 1.

In FIG. 2, reference numeral 41 shows an arc tube as in an ultrahigh pressure mercury lamp which emits white light in a continuous spectrum, and 42 a reflector which reflects and collects the light from the arc tube 41 in a predetermined direction. The arc tube 41 and reflector 42 constitute the lamp unit 1. Reference character y shows an optical axis of an image projection optical system which indicates the traveling direction of the light from the lamp unit 1.

Reference numeral 43a shows a first cylinder array which is formed of an array of lenses having a refractive power in a direction perpendicular to the paper of FIG. 2 (hereinafter referred to simply as a perpendicular direction), 43b a second cylinder array which has an array of lenses corresponding to the respective lenses of the first cylinder array 43a.

Reference numeral 44 shows an ultraviolet absorbing filter, and 45 a polarization changing element which changes non-polarized light into light polarized in a predetermined direction.

Reference numeral 46 shows a front compressor which is formed of a cylindrical lens having a refractive power in a horizontal direction (a direction in the paper of FIG. 2), and 47 a mirror which changes the direction of the optical axis γ 90 degrees. Reference numeral 48 shows a condenser lens and 49 a rear compressor which is formed of a cylindrical lens having a refractive power in the horizontal direction. The abovementioned components from the first cylinder array 43a to the rear compressor 49 constitute the illumination optical system α.

Reference numeral 58 shows a dichroic mirror which reflects light in a wavelength region of blue (B) and red (R) and transmits light in a wavelength region of green (G). Reference numeral 59 shows an incident-side polarizing plate for green which is formed by attaching a polarization element to a transparent substrate and transmits only s-polarized light. Reference numeral 60 shows a first polarization beam splitter which transmits p-polarized light and reflects s-polarized light and has a polarization splitting surface (a polarization splitting film) between a pair of triangular glass blocks.

Reference numerals 61R, 61G, and 61B show a reflecting type liquid crystal display device for red, a reflecting type liquid crystal display device for green, and a reflecting type liquid crystal display device for blue, respectively, each of which reflects incident light and performs image modulation. The liquid crystal display devices 61R, 61G, and 61B are connected to a driving circuit 110 for driving them. The driving circuit 110 is connected to an image information supply apparatus 120 such as a personal computer, DVD player, VCR, and a television tuner. The driving circuit 110 receives video (image) information from the image information supply apparatus 120 and causes the liquid crystal display devices 61R, 61G, and 61B to form original images in accordance with the video information.

Reference numerals 62R, 62G, and 62B show a quarter-wave plate for red, a quarter-wave plate for green, and a quarter-wave plate for blue, respectively. Reference numeral 64 shows an incident-side polarizing plate for green and blue which is formed by attaching a polarizing element to a transparent substrate and transmits only s-polarized light.

Reference numeral 65 shows a first color selective phase difference plate which changes the polarization direction of blue light 90 degrees and does not change the polarization direction of red light. Reference numeral 66 shows a second polarization beam splitter which transmits p-polarized light and reflects s-polarized light and has a polarization splitting surface (a polarization splitting film) between a pair of triangular glass blocks. Reference numeral 67 shows a second color selective phase difference plate which changes the polarization direction of red light 90 degrees and does not change the polarization direction of blue light.

Reference numeral 68 shows an emergence-side polarizing plate (a polarization element) for red and blue which transmits only s-polarized light. Reference numeral 69 shows a third polarization beam splitter serving as a color combination optical member which transmits p-polarized light and reflects s-polarized light and has a polarization splitting surface (a polarization splitting film) between a pair of triangular glass blocks.

The abovementioned components from the dichroic mirror 58 to the third polarization beam splitter 69 constitute the color separation/combination optical system β.

Optical Effects

Next, the optical effects of the abovementioned image display optical system will be described. Light emitting from the arc tube 41 is reflected by the reflector 42 and collected in a predetermined direction. The reflector 42 has a parabolic shape, and the light from the focal point of the parabolic surface is luminous flux generally in parallel with the axis of symmetry of the parabolic surface. However, the source of the light from the arc tube is not an ideal point source of light and has a finite size, so that the collected luminous flux includes a large amount of components of light not parallel with the axis of symmetry of the parabolic surface. The luminous flux is incident on the first cylinder array 43a.

The luminous flux incident on the first cylinder array 43a is split and collected into a plurality of luminous fluxes corresponding to the respective cylinder lenses in band shape extending in the horizontal direction. The plurality of luminous fluxes pass the second cylinder array 43b via the ultraviolet absorbing filter 44 and are focused near the polarization changing element 45.

The polarization changing element 45 is formed of a polarization splitting surface, a reflecting surface, and a half-wave plate. The plurality of luminous fluxes are incident on the polarization splitting surface corresponding to the lines of the respective luminous fluxes and are split into p-polarized light components to be transmitted and s-polarized light components to be reflected. The reflected s-polarized light components are reflected by the reflecting surface and emerge in the same direction as the p-polarized light components. On the other hand, the transmitted p-polarized light components are transmitted through the half-wave plate and changed into polarized light components identical to the s-polarized light components. Thus, the light components polarized in the same direction emerge from the polarization changing element 45.

The plurality of luminous fluxes after the polarization change are reflected 90 degrees by the mirror 47 via the front compressor 46 and reach the condenser lens 48 and the rear compressor 49. The front compressor 46, condenser lens 48, and rear compressor 49 provide those optical effects to superimpose the rectangular images of the abovementioned plurality of luminous fluxes to form a uniform rectangular illumination area. The reflecting type liquid crystal display devices 61R, 61G, and 61B are disposed in the illumination area.

The light changed into s-polarized light by the polarization changing element 45 is incident on the dichroic mirror 58. The dichroic mirror 58 reflects light of blue (at wavelengths from 430 to 495 nm) and light of red (at wavelength from 590 to 650 nm) and transmits light of green (at wavelength from 505 to 580 nm).

Next, the optical path of green light (hereinafter referred to as G light) will be described. The G light transmitted through the dichroic mirror 58 is incident on the incident-side polarizing plate 59. It should be noted that the G light remains s-polarized light after the separation by the dichroic mirror 58. After the G light emerges from the incident-side polarizing plate 59, it is incident as s-polarized light on the first polarization beam splitter 60, reflected by a polarization splitting surface of the first polarization beam splitter 60, and reaches the reflecting type liquid crystal display device 61G for G.

The reflecting type liquid crystal display device 61G for G performs image modulation of the G light and reflects the light. Of the G light (reflected light) after the image modulation, an s-polarized light component is again reflected by the polarization splitting surface of the first polarization beam splitter 60 and returned toward the light source to be removed from light for projection. On the other hand, of the G light after the image modulation, a p-polarized light component is transmitted through the polarization splitting surface of the first polarization beam splitter 60 and is directed as light for projection toward the third polarization beam splitter 69. When all the polarized light components are changed into s-polarized light (black is displayed), the lag axis of the quarter-wave plate 62G provided between the first polarization beam splitter 60 and the reflecting type liquid crystal display device 61G for G can be adjusted in a predetermined direction to reduce the influence of a disturbed polarization state found in the first polarization beam splitter 60 and the reflecting type liquid crystal display device 61G for G.

The G light emerging from the first polarization beam splitter 60 is incident as p-polarized light on the third polarization beam splitter 69, transmitted through a polarization splitting surface of the third polarization beam splitter 69, and reaches the projection lens optical system 70.

Meanwhile, the light of red and the light of blue (hereinafter referred to as R light and B light, respectively) reflected by the dichroic mirror 58 are incident on the incident-side polarizing plate 64. It should be noted that the R light and B light remain s-polarized light after the separation by the dichroic mirror 58. After the R light and B light emerge from the incident-side polarizing plate 64, they are incident on the first color selective phase difference plate 65. The first color selective phase difference plate 65 has the function of rotating the polarization direction of B light 90 degrees. This causes the B light and R light to be incident on the second polarization beam splitter 66 as p-polarized light and s-polarized light, respectively. The R light incident as s-polarized light on the second polarization beam splitter 66 is reflected by a polarization splitting surface of the second polarization beam splitter 66 and reaches the reflecting type liquid crystal display device 61R for R.

The B light incident as p-polarized light on the second polarization beam splitter 66 is transmitted through the polarization splitting surface of the second polarization beam splitter 66 and reaches the reflecting type liquid crystal display device 61B for B.

The R light incident on the reflecting type liquid crystal display device 61R for R is subjected to image modulation and reflected. Of the R light (reflected light) after the image modulation, an s-polarized light component is again reflected by the polarization splitting surface of the second polarization beam splitter 66 and returned toward the light source to be removed from light for projection. On the other hand, of the R light after the image modulation, a p-polarized light component is transmitted through the polarization splitting surface of the second polarization beam splitter 66 and is directed as light for projection toward the second color selective phase difference plate 67.

The B light incident on the reflecting type liquid crystal display device 61B for B is subjected to image modulation and reflected. Of the Blight (reflected light) after the image modulation, a p-polarized light component is again transmitted by the polarization splitting surface of the second polarization beam splitter 66 and returned toward the light source to be removed from light for projection. On the other hand, of the B light after the image modulation, an s-polarized light component is reflected by the polarization splitting surface of the second polarization beam splitter 66 and is directed as light for projection toward the second color selective phase difference plate 67.

In this case, the lag axis of each of the quarter-wave plates 62R and 62B provided between the second polarization beam splitter 66 and the reflecting type liquid crystal display devices 61R and 61B for R and B can be adjusted to make an adjustment of display of black in each of the R and B light as in the G light.

In the projection light of R and B combined into one luminous flux and emerging from the second polarization beam splitter 66, the polarization direction of the R light is rotated 90 degrees and changed into an s-polarized light component by the second color selective phase difference plate 67, and the resulting light is analyzed by the emergence-side polarizing plate 68 and incident on the third polarization beam splitter 69. The B light is transmitted through the second color selective phase difference plate 67 as s-polarized light without any change, and the light is analyzed by the emergence-side polarizing plate 68 and incident on the third polarization beam splitter 69. The analysis by the emergence-side polarizing plate 68 realizes the projection light of R and B which excludes invalid components produced from the transmission through the second polarization beam splitter 66, the reflecting type liquid crystal display devices 61R and 61B for R and B, and the quarter-wave plates 62R and 62B.

The projection light for R and B incident on the third polarization beam splitter 69 is reflected by the polarization splitting surface of the third polarization beam splitter 69 and combined with the abovementioned G light transmitted through that polarization splitting surface. The resulting light reaches the projection lens optical system 70. Thus, the combined projection light for R, G, and B is enlarged and projected on a projected surface such as a screen by the projection lens optical system 70.

Since the optical paths described above are used when the reflecting type liquid crystal display devices operate for white display, description will hereinafter be made of the optical effects when the reflecting type liquid crystal display devices operate for black display.

The optical path of the G light will be described first. The G light (s-polarized light) transmitted through the dichroic mirror 58 is incident on the incident-side polarizing plate 59. Then, the G light is incident on the first polarization beam splitter 60, reflected by the polarization splitting surface thereof, and reaches the reflecting type liquid crystal display device 61G for G. However, the reflecting type liquid crystal display device 61G operates for black display, the G light is reflected without image modulation. As a result, the G light remains the s-polarized light after it is reflected by the reflecting type liquid crystal display device 61G, reflected again by the polarizing splitting surface of the first polarization beam splitter 60, transmitted through the incident-side polarizing plate 59, and returned toward the light source to be removed from projection for light.

Next, the optical paths of the R light and B light will be described. The R light and B light (s-polarized light) reflected by the dichroic mirror 58 are incident on the incident-side polarizing plate 64. After the R light and B light emerge from the incident-side polarizing plate 64, they are incident on the first color selective phase difference plate 65. The first color selective phase difference plate 65 has the function of rotating only the polarization direction of B light 90 degrees. This causes the B light and R light to incident on the second polarization beam splitter 66 as p-polarized light and s-polarized light, respectively.

The R light incident as s-polarized light on the second polarization beam splitter 66 is reflected by the polarization splitting surface of the second polarization beam splitter 66 and reaches the reflecting type liquid crystal display device 61R for R. The B light incident as p-polarized light on the second polarization beam splitter 66 is transmitted through the polarization splitting surface of the second polarization beam splitter 66 and reaches the reflecting type liquid crystal display device 61B for B.

Since the reflecting type liquid crystal display device 61R for R operates for black display, the R light incident on the reflecting type liquid crystal display device 61R for R is reflected without image modulation. As a result, the R light remains the s-polarized light after it is reflected by the reflecting type liquid crystal display device 61R for R, reflected again by the polarizing splitting surface of the second polarization beam splitter 66, transmitted through the incident-side polarizing plate 64, and returned toward the light source to be removed from projection for light. In other words, black is displayed on the projected surface.

On the other hand, since the B light incident on the reflecting type liquid crystal display device 61B for B is reflected without image modulation since the B light incident on the reflecting type liquid crystal display device 61B for B operates for black display. Thus, the B light remains the p-polarized light after it is reflected by the reflecting type liquid crystal display device 61B for B, transmitted again by the polarizing splitting surface of the second polarization beam splitter 66, changed into s-polarized light by the first color selective phase difference plate 65, transmitted through the incident-side polarizing plate 64, and returned toward the light source to be removed from projection for light.

Light Source Apparatus

Figure 3:
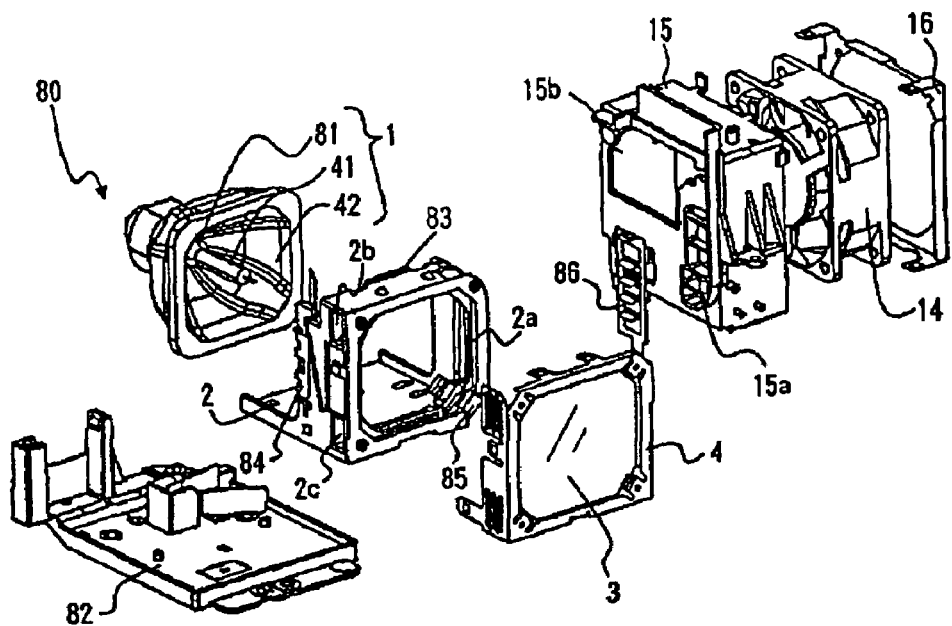
FIG. 3 is an exploded perspective view showing the light source apparatus of Embodiment 1.

Description will hereinafter be made of a cooling structure of the light source apparatus in Embodiment 1 with reference to FIGS. 3 to 5. A light source apparatus 80 has the lamp unit 1, the lamp holder 2 which holds the lamp unit 1, and elastic members 83, 84, and 85 which are interposed between the lamp unit 1 and the lamp holder 2. In addition, the light source apparatus 80 has a lamp holder base 82 which has the structure mountable on the lamp holder 2 and the optical box 6, the explosion-proof glass 3 serving as a light-transmissive cover member which is set in front of the lamp holder 2, and the glass holder 4 for holding the explosion-proof glass 3 on the lamp holder 2.

The lamp cooling fan 14 is disposed on the side of the light source apparatus 80. The lamp cooling fan 14 is an axial fan. The fan holding member 15 provided for holding the lamp cooling fan 14 has a fan duct 15*a* formed integrally therein for blowing cooling wind into a flow inlet 2*a* of the lamp holder 2.

The lamp unit 1 is formed of an arc tube 41 and the reflector 42. The arc tube 41 has a vessel portion 81 serving as a light emitter disposed at the position of the focal point of the reflector 42 and portions 81' and 81" extending in the back and forth direction of the vessel portion 81. The lamp unit 1 is housed in the lamp case portion 6*a* (see FIG. 1) of the optical box 6.

The lamp holder 2 also serves as a wind-guiding member referred to in the present invention. The flow inlet 2*a* for taking the cooling wind in from the lamp cooling fan 14 is formed on the side of the lamp holder 2 closer to the lamp cooling fan 14 in a frame-shaped portion of the lamp holder 2 ahead of the reflector 42 (that is, outside a light-emergence opening of the reflector). The flow inlet 2*a* is provided with a louver 86 for taking the cooling wind in from a direction generally perpendicular to the optical axis γ shown by a dashed line in each of FIGS. 4 and 5.

A wind-guiding wall portion 87 is formed in the lamp holder 2 at a position generally opposite to the flow inlet 2*a* on the side opposite to the side closer to the lamp cooling fan 14 ahead of the reflector 42.

In other words, the flow inlet 2*a* and the wind-guiding wall portion 87 are formed such that they extend in parallel with the emergence optical axis γ of the reflector 42 (which matches the optical axis of the image projection optical system) opposite to each other across the optical axis γ.

In addition, flow outlets 2*b* and 2*c* are formed in an upper portion and a lower portion of the wind-guiding wall portion 87 on the side of the lamp holder 2, respectively, to discharge air at high temperature within the reflector 42.

In the structure described above, when the image projection apparatus is powered on, the vessel portion 81 of the arc tube 41 emits light to increase the temperature of the lamp unit 1. This causes an increase in temperature of the air between the lamp case portion 6*a* (see FIG. 4) and the light source apparatus 80.

The power-on starts rotation of the lamp cooling fan 14. Then, cooing wind from the lamp cooling fan 14 flows in through the fan duct 15*a* integrally formed in the fan holding member 15 and the flow inlet 2*a* as shown by arrows in FIGS. 4 and 5. At this point, the cooling wind is directed by the louver 86 such that it mainly flows in the direction generally perpendicular to the optical axis γ and is blown into the space surrounded by the reflector 42, the lamp holder 2, and the explosion-proof glass 3.

Figure 4:
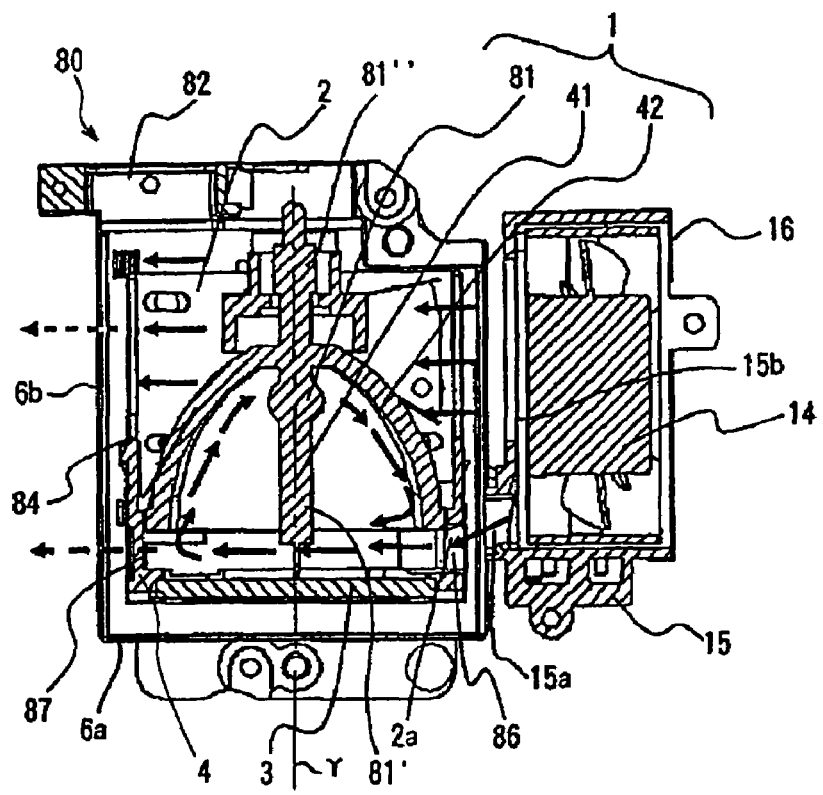
FIG. 4 is a section view showing the light source apparatus of Embodiment 1.
Figure 5:
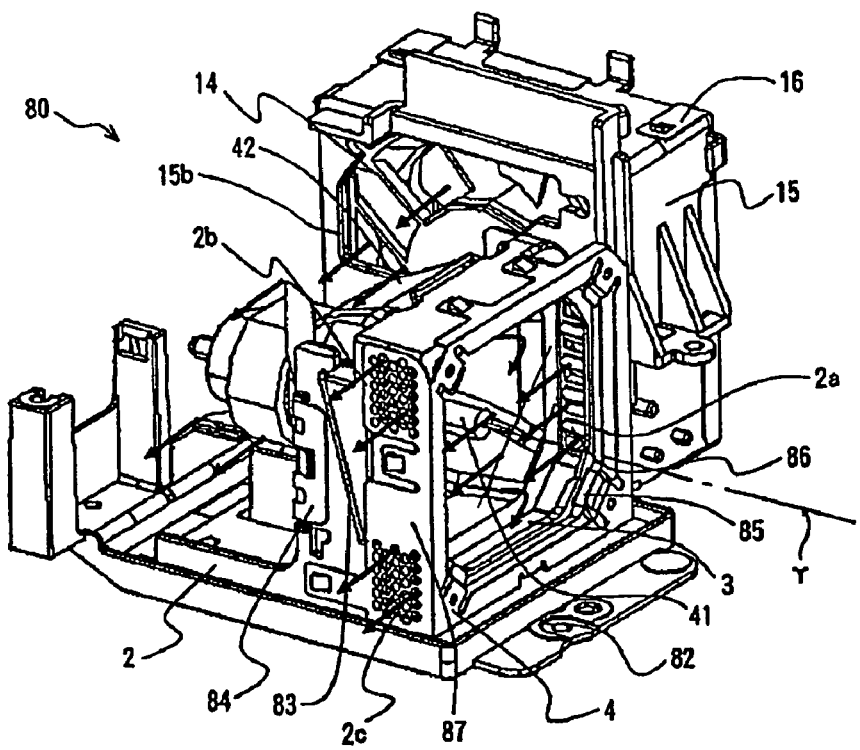
FIG. 5 is a perspective view showing the light source apparatus of Embodiment 1.

The cooling wind blown into that space in the direction generally perpendicular to the optical axis γ is guided toward the wind-guiding wall portion 87 while it cools the explosion-proof glass 3 and the forward end (81') of the arc tube 41 as shown by arrows in FIGS. 4 and 5. The cooling wind hitting the wind-guiding wall portion 87 is prevented from flowing forward by the explosion-proof glass 3, so that it flows backward toward the inner side of the reflector 42, that is, the vessel 81. The cooling wind is blown to and cools the vessel portion 81 which is the heat source, and it cools the inner surface of the reflector 42 at the same time.

The cooling wind which cooled the inner surface of the reflector 42 and the vessel portion 81 flows forward along the portion of the inner side of the reflector 42 closer to the flow inlet 2*a* as shown by arrows in FIGS. 4 and 5. The wind is then discharged outside the light source apparatus 80 from the flow outlets 2*b* and 2*c* provided in the upper and lower portions of the wind-guiding wall portion 87 and discharged outside the optical box 6 from an opening 6*b* formed in the lamp case portion 6*a*.

In this manner, according to Embodiment 1, the cooling wind is forcedly directed by the wind-guiding wall portion 87 (and the explosion-proof glass 3) toward the vessel portion 81 in the reflector 42 and then discharged, so that the vessel portion 81 which requires the most appropriate cooling can be cooled efficiently.

In this case, since the direction of the series of cooling wind flows from the flow inlet 2*a* toward the flow outlets 2*b* and 2*c* is not quickly changed, the vessel portion 81 can be cooled directly on a constant basis. In other words, the vessel portion 81 can be cooled efficiently with a small amount of wind, so that the revolutions of the lamp cooling fan 14 can be set to a low level to reduce the occurrence of noise. In addition, since the lamp cooling fan 14 can be reduced in size, which contributes to a reduction in size of the entire image projection apparatus.

The cooling wind produced by the lamp cooling fan 14 is blown from the opening 15*b* different from than the duct 15*a* toward the space between the lamp case portion 6*a* and the light source apparatus 80 and the outer surface of the reflector 42 as shown by arrows in FIGS. 4 and 5, and discharged outside the optical box 6 from the opening 6*b* formed in the lamp case portion 6*a*.

This can prevent high-temperature air from being stored in the space between the lamp case portion 6*a* and the light source apparatus 80 and can achieve efficient cooling of the reflector 42.

In this manner, after the cooling wind cools the arc tube (vessel portion 81) and the inner and outer surfaces of the reflector 42, passes between the lamp case portion 6*a* and the light source apparatus 80, and is discharged outside the optical box 6 from the opening 6*b* formed in the lamp case portion 6*a*, it is discharged outside the image projection apparatus from the exhaust port 24*a* formed in the external side plate 24 by the exhaust fan 18 shown in FIG. 1.

The high-temperature air discharged from the flow outlets 2*b* and 2*c* and the cooling wind at lower temperature which cooled the outer surface of the reflector 42 and the like are discharged from the opening 6*b* formed in the lamp case portion 6*a*, so that both are stirred. Thus, the temperature of the air discharged outside the image projection apparatus by the exhaust fan 18 can be reduced.

In Embodiment 1, the lamp holder 2, the lamp holder base 82, and the lamp case portion 6*a* (the optical box 6) near the lamp unit 1 are made of a heat resistant/flame retardant resin material such as polyphenylene sulfide. In this case, the axial fan can be used as the lamp cooling fan 14 as in Embodiment 1 to blow the cooling wind to the resin material to prevent degradation due to the heat, resulting in improved durability.

Next, description will be made in detail of the reason for providing the two systems, that is, the system for flowing the cooling wind from the flow inlet directly to the flow outlet and the system for once blowing the cooling wind to the wind-guiding wall portion and circulating it in the reflector 42 before it is flowed out.

If only the system for flowing the cooling wind from the flow inlet directly to the flow outlet is provided, the main air flow is for discharging the high-temperature air stored in the reflector. Thus, the cooling wind is not easily flowed along the vessel portion of the arc tube which is the heat source, and the cooling efficiency tends to reduce.

On the other hand, if only the system for blowing the cooling wind to the wind-guiding wall portion and circulating it before it is flowed out is provided, the cooling wind is easily blown to the vessel portion, so that the cooling efficiency tends to increase for the heat source. However, the volume in the reflector is larger than the vessel portion, and unless the system for discharging the high-temperature air stored in the reflector is provided, the temperature of the cooling wind flowing toward the vessel portion is increased and the cooling efficiency tends to reduce.

Consequently, the two systems, that is, the system for flowing the cooling wind from the flow inlet directly to the flow outlet and the system for blowing the cooling wind to the wind-guiding wall portion and circulating it before it is flown out can be provided to efficiently reduce the temperature of the lamp unit as compared with the abovementioned cases.

Embodiment 2

Figure 6:
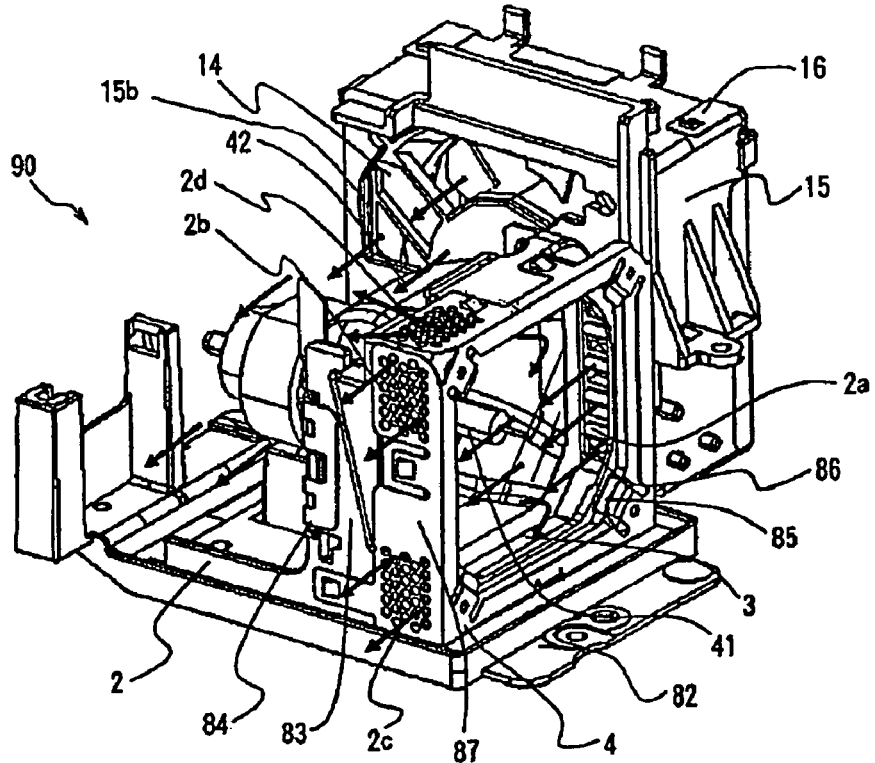
FIG. 6 is a perspective view showing a light source apparatus which is Embodiment 2 of the present invention.
Figure 7:
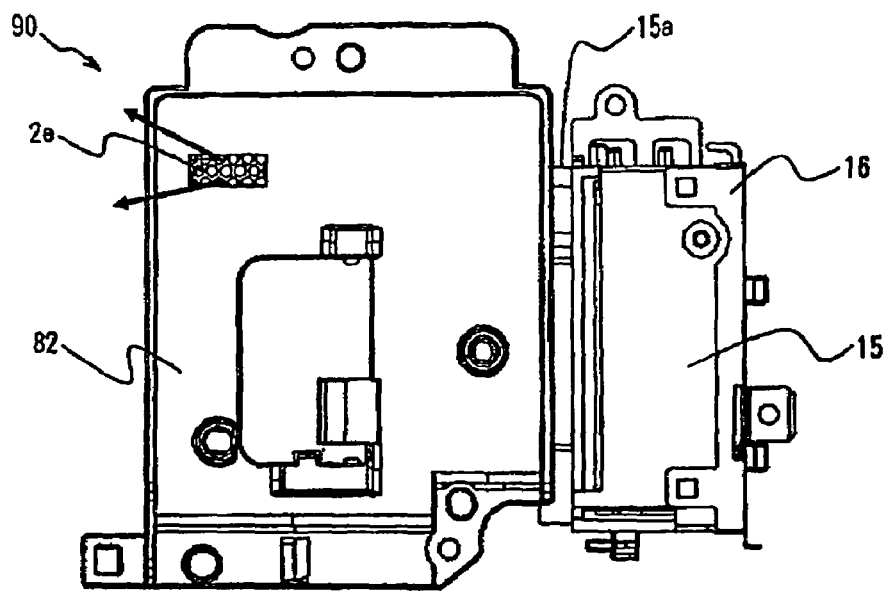
FIG. 7 shows the bottom of the light source apparatus of Embodiment 2.

FIGS. 6 and 7 show the structure of a light source apparatus which is Embodiment 2 of the present invention. In Embodiment 2, description will be centered on differences from Embodiment 1. In Embodiment 2, components identical to those in Embodiment 1 are designated with the same reference numerals as those in Embodiment 1 and description thereof is omitted.

In the light source apparatus 90 of Embodiment 2, in addition to flow outlets 2b and 2c formed together with a wind-guiding wall portion 87 on the side of a lamp holder 2 opposite to the side in which a flow inlet 2a is formed, flow outlets 2d and 2e are also formed in an upper surface and a lower surface of the lamp holder 2, respectively. With this structure, the total opening area of the flow outlets 2b, 2c, 2d, and 2e is set to be larger than the opening area of the flow inlet 2a.

The reason thereof is as follows. The air blown out of the reflector 42 from the flow outlet is at higher temperature than the temperature of the air flowing into the reflector 42 since it cooled the heat of the arc tube. In other words, the air blown out from the flow outlet is heated and expanded as compared with the air at the time of inflow and its volume is increased. Thus, the flow outlet needs to have a larger area than the flow inlet in accordance with the volume increase.

In the structure described above, the cooling wind which cooled a vessel portion 81 through the path similar to that in Embodiment 1 is discharged from the flow outlets 2b, 2c, 2d, and 2e. Similarly to Embodiment 1, since the direction of the series of cooling wind flows from the flow inlet 2a toward the flow outlets 2b, 2c, 2d, and 2e is not changed quickly, the vessel portion 81 can be cooled effectively on a constant basis. In addition, the total opening area of the flow outlets 2b, 2c, 2d, and 2e is set as described above relative to the opening area of the flow inlet 2a, so that the cooling wind which is at higher temperature and has an expanded volume since it cooled the entire arc tube 41 including the vessel portion 81 and the reflector 42 can be smoothly discharged outside the reflector 42 and the light source apparatus 80. This can result in a more excellent cooling effect.

In other words, since the lamp unit 1 can be effectively cooled with a smaller amount of wind than in Embodiment 1, the lamp cooling fan 14 can be operated at lower revolutions (with a smaller amount of wind) to further reduce the occurrence of noise. In addition, the size of the lamp cooling fan 14 can be reduced.

Since more flow outlets 2b, 2c, 2d, and 2e are formed (formed in a plurality of directions) as compared with Embodiment 1, it is possible to further stir the high-temperature air discharged from the flow outlets 2b, 2c, 2d, and 2e and the cooling wind at lower temperature which cooled the external surface of the reflector 42, thereby making it possible to reduce the temperature of the air discharged outside the image projection apparatus by an exhaust fan 18.

Furthermore, the temperature of the air blown to the exhaust fan 18 is reduced, so that a reduction in life of the exhaust fan 18 due to heat can be prevented to improve durability.

Embodiment 3

Figure 8:
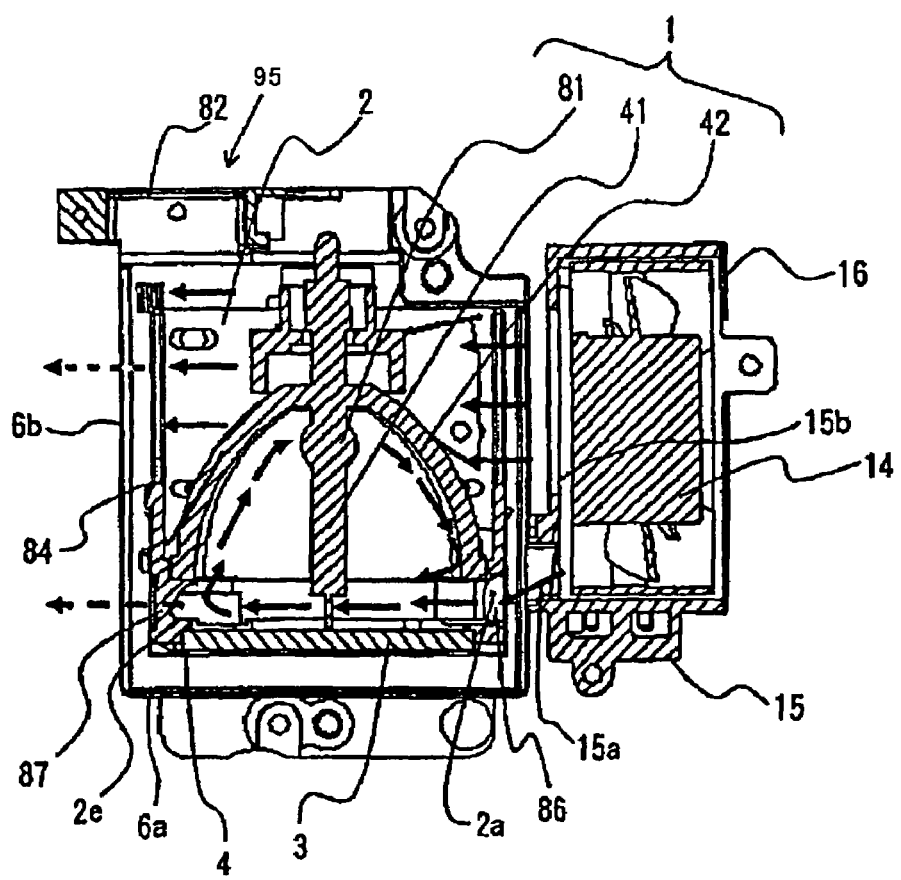
FIG. 8 is a section view showing a light source apparatus which is Embodiment 3 of the present invention.

FIG. 8 shows the structure of a light source apparatus which is Embodiment 3 of the present invention. In Embodiment 3, description will be centered on differences from Embodiment 1 described above. In Embodiment 3, components identical to those in Embodiment 1 are designated with the same reference numerals as those in Embodiment 1 and description thereof is omitted.

In the light source apparatus 95 of Embodiment 3, a wind-guiding wall portion 87, which has a planar shape in Embodiment 1, is formed as a curved surface. The curved surface is a shape suitable for more smoothly supplying cooling wind flowing in from a flow inlet 2a through a path similar to that in Embodiment 1 toward the inner side of a reflector 42. With this structure, the cooling wind can be blown to a vessel portion 81 with little reduction in the wind speed due to the cooling wind hitting the wind-guiding wall portion 87. This can achieve a more excellent cooling effect for the vessel portion 81.

Thus, a lamp unit 1 can be cooled with a smaller amount of wind (at lower revolutions) or by using a smaller fan than in Embodiments 1 and 2.

As described above, according to each of Embodiments 1 to 3, since the vessel portion 81 serving as the light emitter can be efficiently cooled with a small amount of wind, it is possible to reduce the revolutions and the size of the lamp cooing fan 14 to contribute to a reduction in noise and size of the image projection apparatus.

In addition, since an opening such as a notch serving as a flow inlet or a flow outlet of cooling wind does not need to be formed in the reflector 42, the machining cost of the reflector (lamp unit) can be reduced.

Embodiments 1 to 3 have been described in conjunction with the examples in which the flow inlet and the flow outlet of cooling wind in the light source apparatus are formed in the lamp holder 2 to eliminate the need for forming a flow inlet and a flow outlet in the reflector 42. However, the present invention is not limited thereto, and the reflector may be provided with at least one of the flow inlet and the flow outlet.

While Embodiments 1 to 3 have been described of the case where the wind-guiding wall portion is provided outside the light-emergence opening of the reflector, that is, on the outer side ahead of the reflector, it is possible to dispose the wind-guiding wall portion in an area inside the reflector where light reflection by the reflector is little affected.

In addition, while Embodiments 1 to 3 have been described of the case where the axial fan disposed closer to the flow inlet is used to blow cooling wind into the light source apparatus, the type of the fan is not limited to the axial fan in the present invention, and another fan may be used such as a sirocco fan and a cross flow fan. Moreover, it is possible that a fan is provided closer to the flow outlet to take air in from the inside of the light source apparatus to generate a cooling wind flow which flows in from the flow inlet.

Embodiment 4

Figure 9:
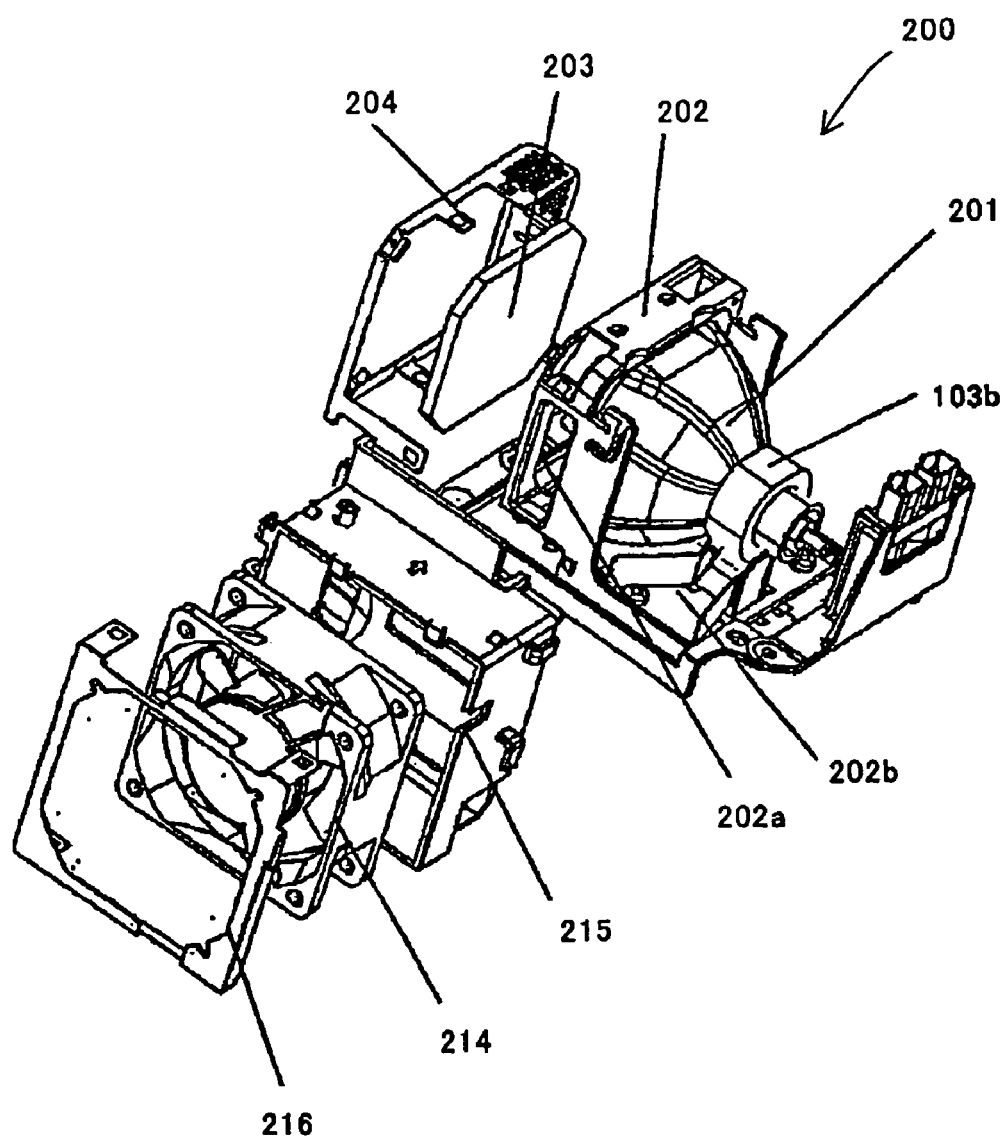
FIG. 9 is an exploded perspective view showing a light source apparatus which is Embodiment 4 of the present invention.
Figure 10:
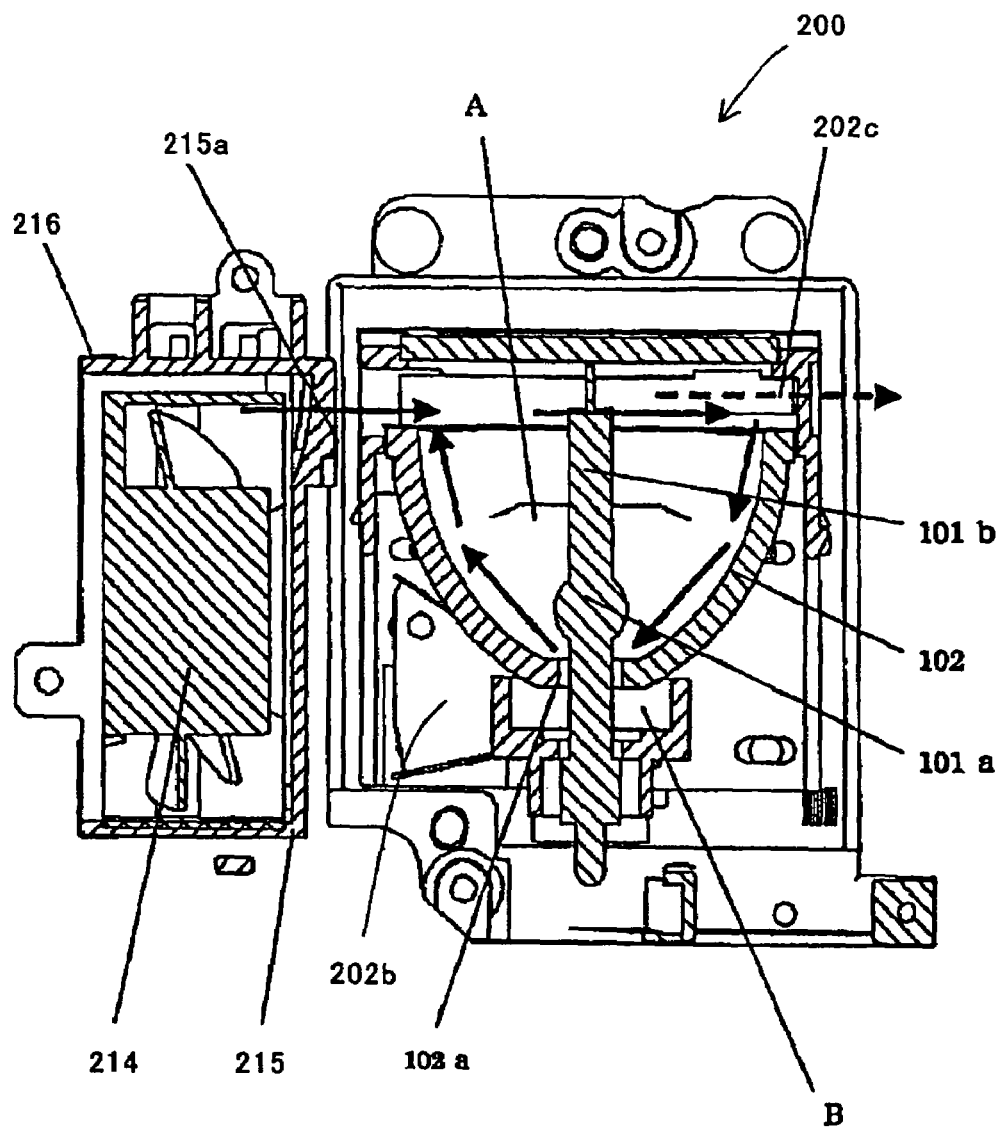
FIG. 10 is an explanatory diagram showing the flow of cooling wind within the light source apparatus in Embodiment 4.

FIGS. 9 and 10 show a light source apparatus 200 which is Embodiment 4 of the present invention. The light source apparatuses of Embodiments 4 to 6 differ from those in Embodiments 1 to 3 in their cooling methods. However, the light source apparatuses of Embodiments 4 to 6 are applied to the same image projection apparatus serving as the optical apparatus described in Embodiment 1.

As shown in FIG. 9, a lamp unit (for example, an ultrahigh pressure mercury discharge lamp) 201 is formed of an arc tube 101 which contains electrode seal portions 101b and 101c disposed opposite to each other in a spherical portion 101a, a reflector 102 which changes light from the arc tube 101 into collimated light, and an connecting member which optically aligns the arc tube 101 with the reflector 102 and then connects them.

One of the electrode seal portions 101b and 101c may be a cathode and the other may be an anode. In Embodiment 4, description will be made of the case where the seal portion 101b is the anode and the seal portion 101c is the cathode.

The connecting member 103 has an opening (not shown) formed therein in a vertical direction, and a mesh filter, for example, is attached to the opening of the connecting member 103.

The lamp unit 201 is fixed to a lamp holder 202 via a holding member (not shown) such a spring. The lamp holder 202 is provided with an opening 202a serving as an inlet of cooling wind and an opening (not shown) serving as an outlet of the wind after cooling. A front glass (explosion-proof glass) 203 is attached to the lamp holder 202 with a glass holder 204. The lamp holder 202 also has a wind-guiding wall 202b formed therein which has a shape for directing cooling wind flowing along the bottom of the lamp holder 202 toward the opening (the cathode seal portion 101c) of the lamp connecting member 103.

While the lamp holder 202 has the plurality of openings in this structure, the reflector 102 may has the opening 202a for air intake and the opening for exhaust (not shown) formed therein. In addition, the front glass 203 may be adhered to the reflector 102, and in this case, the glass holder 204 is not necessary.

A cooling fan 214 is disposed on the side of the lamp unit 201 and is fixed by a fan holding plate 216 to a fan holding base 215 having a plurality of openings.

With this structure, cooling wind supplied from the fan 214 passes through an opening 215a formed in the fan holding base 215. Part of the cooling wind is supplied into the reflector 102 from the opening 202a formed in the lamp holder 202. The cooling wind cools the area closer to the anode seal portion 101b of the arc tube 101 and hits the wall of the lamp holder 202 opposite to the opening 202a to flow along the wall surface of the reflector 102 toward the spherical portion 101a of the arc tube 101 as arrows shown in FIG. 10. In this manner, the spherical portion 101a at the highest temperature can be cooled. The air further flows along the inner wall surface of the reflector 102 and is discharged from an opening 202c of the lamp holder 202.

Figure 11:
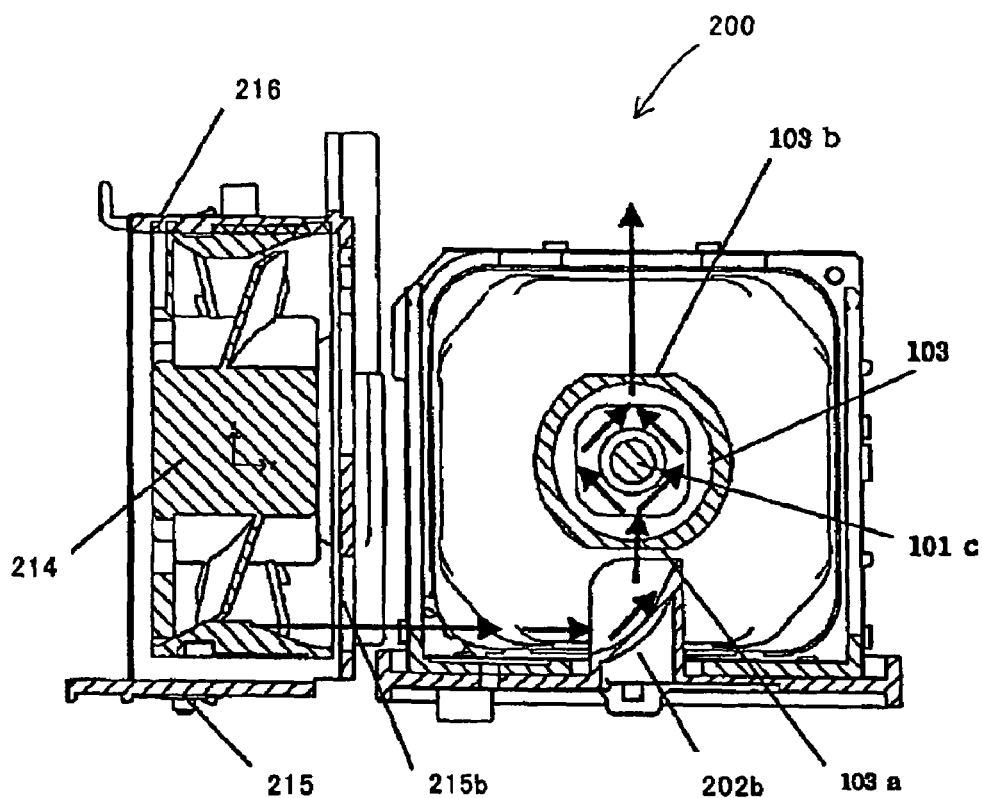
FIG. 11 is an explanatory diagram showing the flow of cooling wind within the light source apparatus in Embodiment 4.

On the other hand, as shown in FIG. 11, another part of the cooling wind supplied from the fan 14 passes through an opening 215b different from the opening 202a formed in the fan holding base 215. The cooling wind is collected by the wind-guiding wall 202b formed on the lamp holder 202, and is supplied from an opening 103a formed in the lamp connecting member 103 with its wind speed and wind pressure increased. The cooling wind supplied into the connecting member 103 from the opening 103a cools the cathode seal portion 101c of the arc tube 101 and then is discharged from an opening 103b of the connecting member 103.

An opening 102a is formed at the coupling portion of the reflector 102 and the connecting member 103 at the back of the reflector 102 to allow alignment and securing of the arc tube 101. However, the opening 102a has an arrow aperture which is resistant to air flow. In addition, in Embodiment 4, the wind is also supplied from the air intake opening 202a for the reflector 102 and the opening 103a of the connecting member 103, so that the pressure is increased within the reflector 102 and within the connecting member 103. Thus, little air communication occurs between the cooling wind flowing within the reflector 102 and the cooling wind supplied into the connecting member 103, which otherwise may interfere with those flows. As a result, each flow of the cooling wind from the intake to exhaust can be separately made.

With the separate flows, the electrode seal portions 101b and 101c at relatively low temperature in the arc tube 101 are cooled by the cooling wind flows at relatively low temperature immediately after they are supplied from the fan 214. On the other hand, the spherical portion 101a at the highest temperature in the arc the 101 is cooled by the wind after it cools the anode seal portion 101b. This can realize efficient cooling.

In view of the situation after the lamp is turned off, the spherical portion 101a and the anode seal portion 101b disposed within the reflector 102 are not easily cooled in a short time period since they were at high temperature due to the heat when the lamp was lit. The separate cooling wind is used to cool the cathode seal portion 101c disposed in space B in FIG. 10 different from space A in FIG. 10 within the reflector 102 in which the spherical portion 101a at the highest temperature exists, so that the temperature of the cathode seal portion 101c can be reduced prior to the spherical portion 101a and the anode seal portion 101b. The "separate" means that another component to be cooled has no influence.

Figure 12:
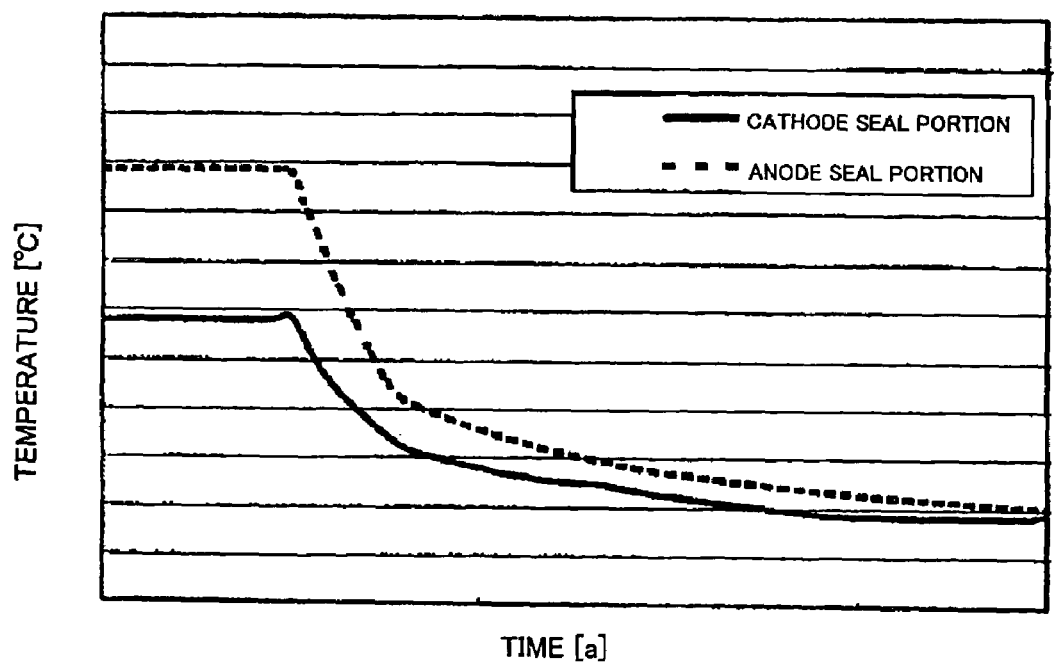
FIG. 12 is a graph of temperature changes for showing the effects of Embodiment 4.

FIG. 12 shows data obtained from the measurement of the temperature of the anode seal portion 101b and the cathode seal portion 101c in the light source apparatus 200 of Embodiment 4.

In FIG. 12, the horizontal axis represents time and the vertical axis represents temperature. It can be seen from FIG. 12 that the cathode seal portion is cooled at all times at lower temperature. As a result, when mercury contained in the spherical portion 101a of the arc tube 101 is condensed, it is always adhered to the cathode the temperature of which is reduced below the boiling point first. Thus, in a glow discharge period which is essential to the next lighting of the lamp, the mercury can prevent positive ions from colliding with the cathode and sputtering it. Thus, evaporation of tungsten which causes blacking can be avoided as much as possible, and consequently, the life of the lamp was successfully increased.

Supplementary description will be made of the adhesion of mercury in the lamp. It is widely known that the boiling temperature of mercury at which it is condensed depends on the atmospheric pressure. Since the spherical portion 101a of the arc tube 101 is at high temperature in the discharge lamp used in Embodiment 4, it can be presumed that the atmospheric pressure is increased. However, the actual atmospheric pressure is not known during the period in which the temperature is reduced after the lamp is turned off, and the boiling temperature cannot be determined. In addition, the behavior of the mercury until it is securely adhered is not clearly found. For these reasons, Embodiment 4 employs the structure in which the cathode to which the mercury should be adhered is always at lower temperature.

Embodiment 5

Figure 13:
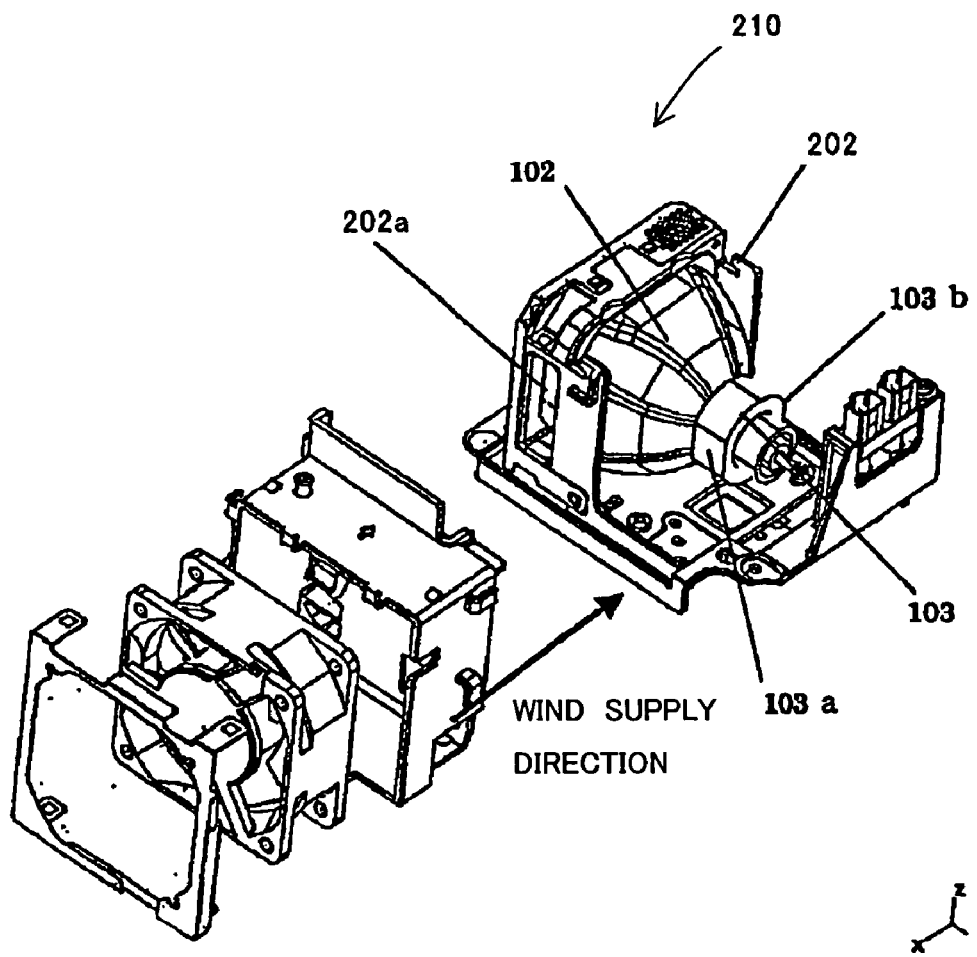
FIG. 13 is an exploded perspective view showing a light source apparatus in Embodiment 5 of the present invention.

FIG. 13 schematically shows the structure of a light source apparatus 210 which is Embodiment 5 of the present invention. In Embodiment 4, the opening 103a of the connecting member 103 is formed perpendicularly to the direction of the wind supplied from the fan 214. However, the similar effects can be provided when openings 103a and 103b are formed in the same direction as the direction of wind supplied from a fan 214 as shown in FIG. 13. In this case, as in Embodiment 4, separate flows are formed by cooling wind supplied from an opening 202a of a lamp holder 202 into a reflector 102 and cooling wind supplied from the opening 103a of the connecting member 103 into the connecting member 103.

As in Embodiment 4, electrode seal portions 101b and 101c are cooled by cooling wind flows at relatively low temperature immediately after they are supplied from the fan 214. On the other hand, a spherical portion 101a at the highest temperature in an arc the 101 is cooled by cooling wind after it cools the anode seal portion 101b. This can realize efficient cooling. The effects after the lamp is turned off are similar to those in Embodiment 4.

In Embodiment 5, since the opening 103a formed in the connecting member 103 is relatively narrow, a wind-guiding wall (not shown) for guiding the wind to the opening 103a can be provided to increase the amount and pressure of the supplied wind, thereby allowing a more excellent cooling effect.

Embodiment 6

Figure 14:
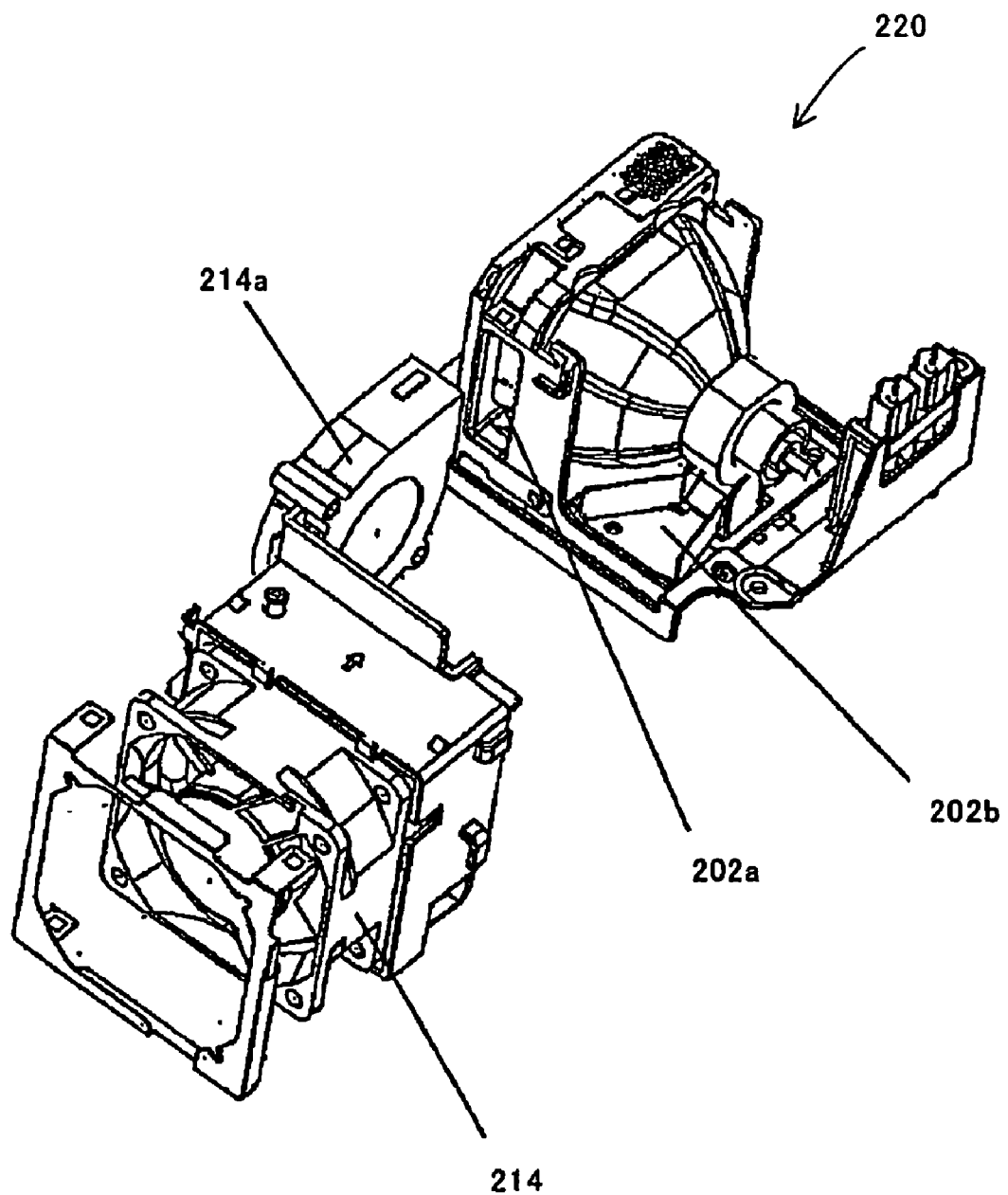
FIG. 14 is an exploded perspective view showing a light source apparatus in Embodiment 6.
Figure 15:
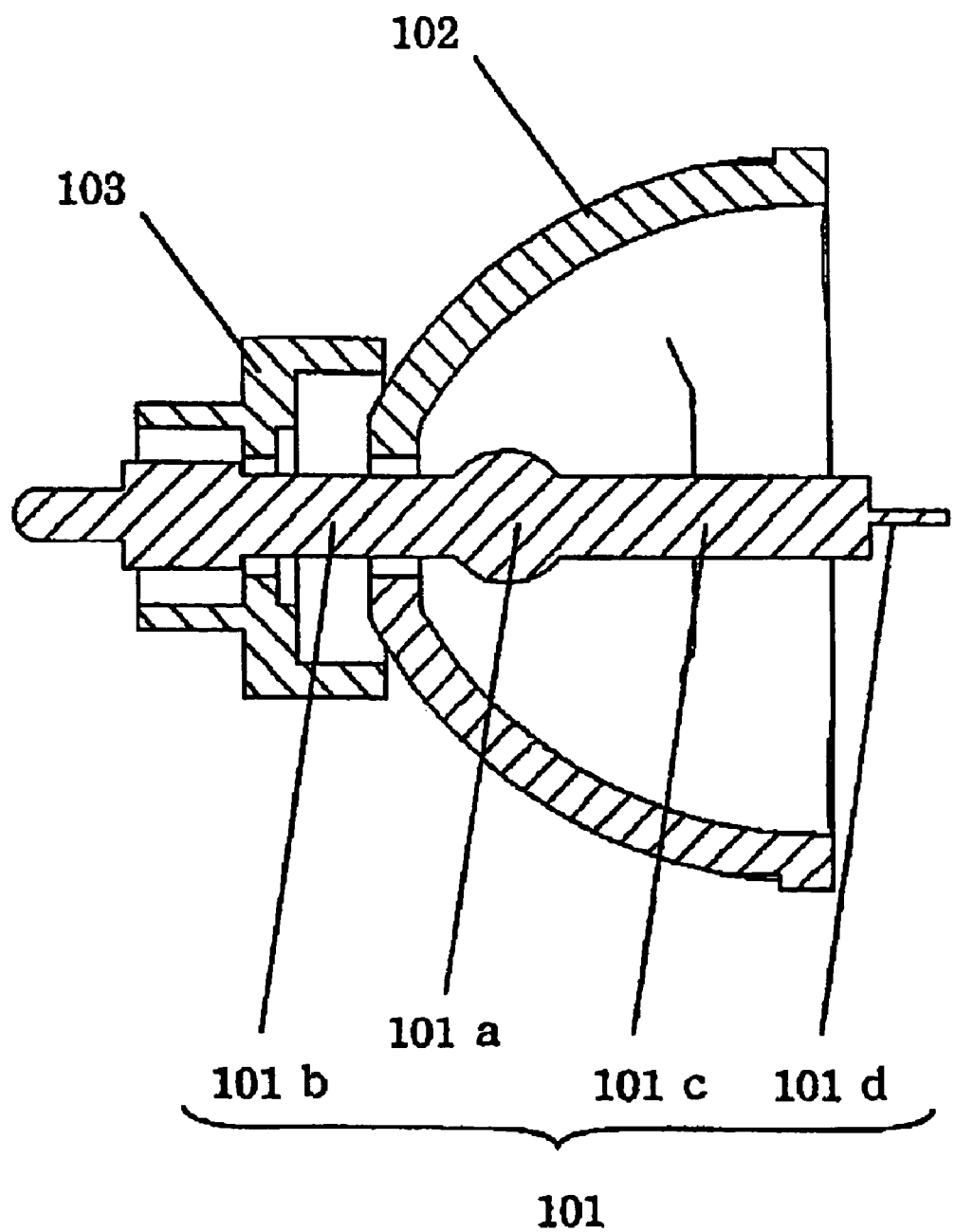
FIG. 15 is an explanatory diagram showing the structure of a mercury discharge lamp used in Embodiments 1 to 6.
Figure 16:
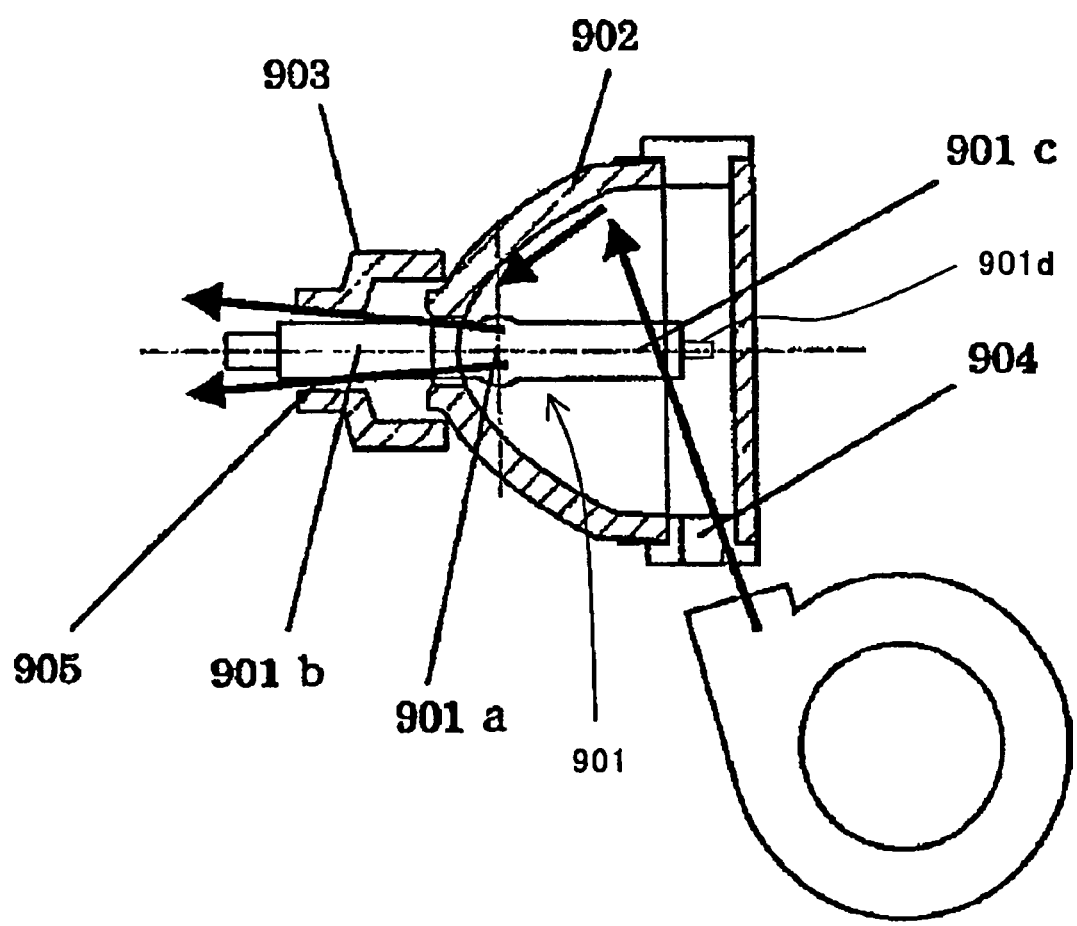
FIG. 16 is a diagram for explaining a prior art.
Figure 17:
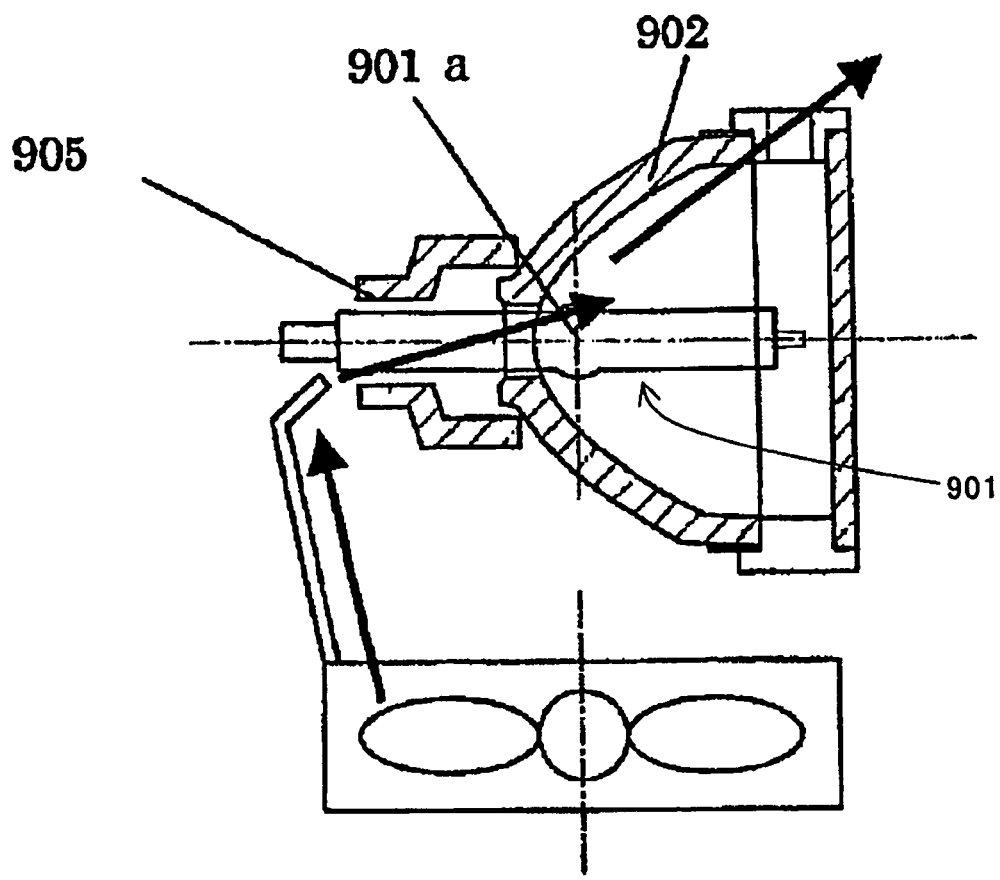
FIG. 17 is a diagram for explaining a prior art.

FIG. 14 schematically shows the structure of a light source apparatus 220 which is Embodiment 6 of the present invention. While Embodiments 4 and 5 have been described of the directions of the openings 103a and 103b formed in the connecting member 103, both of them employ the structure in which the cooling wind from the single fan 214 is divided.

In contrast, in Embodiment 6, it is possible that separate fans 214 and 214a are used to generate cooling wind supplied from an opening 202a of a lamp holder 202 into a reflector 102 and cooling wind supplied from an opening 103a of a connecting member 103 into a connecting member 103.

In FIG. 14, the fan 214 which supplies the cooling wind from the opening 202a into the reflector 102 is realized by a sirocco fan 214a, while the fan 214 which supplies the cooling wind from the opening 103a via a wind-guiding wall 202b into the connecting member 103 is realized by an axial fan.

However, the type and combination of the fans are not limited thereto in the present invention, and the type or combination of the fans may be changed in view of peripheral space or the like.

In Embodiment 6, as in the other Embodiments, electrode seal portions 101b and 101c are cooled by cooling wind flows at relatively low temperature immediately after they are supplied from the fans 214a and 214. On the other hand, a spherical portion 101a at the highest temperature in an arc the 101 is cooled by cooling wind after it cools an anode seal portion 101b. This can realize efficient cooling. The effects after the lamp is turned off are similar to those in Embodiments 4 and 5.

Since the opening (see the opening 103a in FIG. 11) formed in the connecting member 103 is relatively narrow, a wind-guiding wall 202b for guiding the wind to the opening can be provided to increase the amount and pressure of the wind, thereby allowing a more excellent cooling effect.

While Embodiments 1 to 6 have been described in conjunction with the image projection apparatus, the present invention is applicable to a light source apparatus in an optical apparatus other than the image projection apparatus such as an exposure apparatus and a copier.

This application claims a foreign priority based on Japanese Patent Applications Nos. 2004-271055 and 2004-272532, both filed on Sep. 17, 2004, and each of which is hereby incorporated by reference herein.

What is claimed is:

1. A light source apparatus comprising:
   a light emitter;
   a reflector which reflects light from the light emitter and causes the reflected light to emerge; and
   a wind-guiding member which has a flow inlet and a flow outlet of cooling wind and has a wall portion at a position opposite to the flow inlet, the wall portion guiding the cooling wind toward the light emitter in the reflector,
   wherein the flow inlet and the wall portion are formed such that they extend in parallel with an emergence optical axis of the reflector on the opposite sides of the emergence optical axis.

2. The light source apparatus according to claim 1, wherein the wind-guiding member is disposed outside a light-emergence opening of the reflector.

3. The light source apparatus according to claim 1, wherein the wall portion has a curved shape.

4. The light source apparatus according to claim 1, wherein the flow outlet is formed on a side of the wind-guiding member on which the wall portion is provided.

5. The light source apparatus according to claim 1, wherein the flow outlet is formed on a side of the wind-guiding member different from a side thereof on which the wall portion is provided.

6. The light source apparatus according to claim 1, wherein the area of the flow outlet is larger than the area of the flow inlet.

7. The light source apparatus according to claim 1, wherein the wind-guiding member holds a cover member which has light transmittance.

8. The light source apparatus according to claim 1, wherein the wind-guiding member is formed integrally with a holding member which holds a lamp unit which includes the light emitter and the reflector.

9. The light source apparatus according to claim 1, further comprising a fan which flows the cooling wind through the flow inlet.

10. An image projection apparatus comprising:
    the light source apparatus according to claim 1;
    an image forming device which modulates light from the light source apparatus; and
    a projection optical system which projects light from the image forming device.

* * * * *